July 29, 1969  P. KAPTEYN ET AL  3,458,696

ELECTRONIC FLASHGUN FOR PHOTOGRAPHIC PURPOSES

Filed Oct. 7, 1965  2 Sheets-Sheet 1

Inventors:
Paul Kapteyn

July 29, 1969     P. KAPTEYN ET AL     3,458,696
ELECTRONIC FLASHGUN FOR PHOTOGRAPHIC PURPOSES
Filed Oct. 7, 1965     2 Sheets-Sheet 2

Inventors:
Paul Kapteyn
Walter [illegible]

United States Patent Office 3,458,696
Patented July 29, 1969

3,458,696
ELECTRONIC FLASHGUN FOR PHOTOGRAPHIC PURPOSES
Paul Kapteyn, Am Pfarracker 15, and Walter Schmidt, Luzerner Strasse 19, both of Berlin, Germany
Filed Oct. 7, 1965, Ser. No. 493,935
Claims priority, application Germany, Oct. 9, 1964, L 38,118, Patent 1,909,502
U.S. Cl. G03b 15/05
U.S. Cl. 240—1.3      1 Claim

ABSTRACT OF THE DISCLOSURE

An electronic flashgun attachment for a photographic camera. The flashgun comprises a solid unit having upper and lower structural parts joined by a rigid member. The upper and lower structural parts contain connectors for connecting the flashgun to the top and lower sides of the camera. The flashgun contains the electrical components required to produce the flash.

---

The invention relates to an electronic flashgun which can be mechanically connected to a camera and aims to unite camera and flashgun in the event of use into a compact, dismantleable, comfortably operated unit of aesthetic appearance.

It is generally known that for making flashlit photographs the electronic flashgun can be removably mounted at the side, on top of or underneath the camera. It is also known that an electronic flashgun itself can be incorporated in the camera as a fixed component.

The invention proposes a different form of design of an electronic flashgun which can be connected mechanically to a camera for performing flashlight photographs. The electronic flashgun in accordance with the invention comprises upper and lower structural parts, said parts being joined by means of a rigid member and containing the electrical components required to produce the flash, said upper part being adapted to contact the top side of a camera attached to said flashgun and having means for rigid connection with the top side of said camera, said lower part being adapted to contact the bottom side of said camera and having means for the rigid connection with the bottom side of said camera.

The electric lead wires required for connecting the individual electric components of the flashgun unit are mounted on this web and accommodated in the same. Where the flashgun and this web are made of a plastics material the electric leads can be, e.g., moulded-in in the web. The flashgun in accordance with the invention is, e.g., mounted on the camera from behind so that the camera is, e.g., embraced top and bottom by the parts of the flashgun.

A further embodiment of the invention consists in the web connecting the parts of the flashgun being at the same time formed as the back wall of the camera. The fastening of the flashgun to the camera can either be by spring elements, e.g., suitably shaped leaf springs which embrace the camera casing, or the flashgun is mounted on the camera by means of the retaining shoe and the stand or tripod thread of the camera.

Further the electrical connection of camera and flashgun may be made in a known manner over the middle contact of the retainer shoe or in a known manner by means of a synchronizing cable.

The invention is described in detail by way of exemplary design shown in the accompanying drawings wherein—

Figure 1:
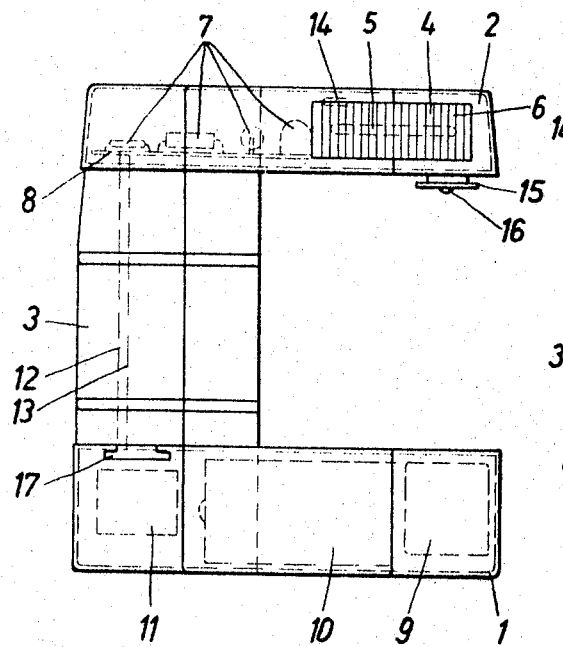
FIG. 1 shows the main view of the flashgun in accordance with the invention from the front.
Figure 2:
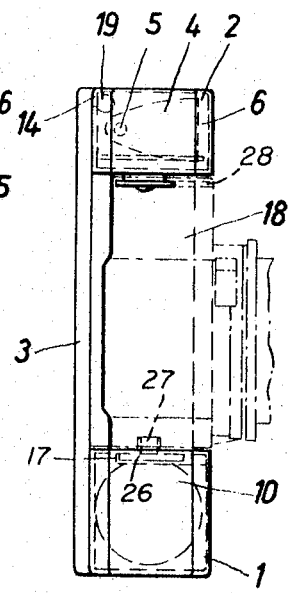
FIG. 2 shows the appropriate side view, the camera being indicated by broken lines pushed between the parts of the flashgun.

In FIGS. 1 and 2, 1 and 2 are the two parts of the electronic flashgun with the solid web 3, which connects mechanically the two parts 1 and 2 of the flashgun. In the upper part 2 of the flashgun reflector 4 with the discharge lamp 5 is accommodated. This reflector 4 is as shown in FIG. 2 accommodated inside the casing part 2. The opening of reflector 4 is closed in the known manner by a Plexiglas pane 6. The electrical circuit elements of the flashgun circuit are marked 7, and are, e.g., accommodated on a printed circuit plate 8 in the upper part 2 of the casing. In casing part 1, e.g., the battery 9, the storage capacitor 10 and transformer 11 are disposed. These electric elements are connected over the electric lead wires 12 and 13 with the upper printed circuit plate 8 and the circuit elements 7 incorporated thereon. Moreover all these electric components are connected together in known manner as to produce the flash. The electric double lead 12, 13 is merely intended to symbolize the electric connection between lower and upper parts. There can naturally be more than two electric lead wires. 14 is a small slit-like opening in the back wall of the upper casing part 2, through which in known manner a glow lamp can be observed acting as a control element and signalling device and indicating that the storage capacitor 10 is adequately charged.

Figure 2A:
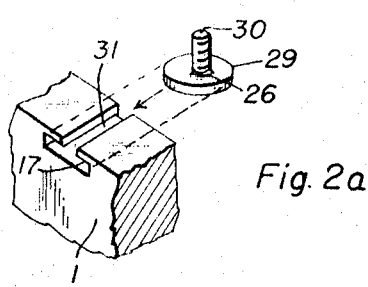
FIG. 2a shows details of the connection elements.

On the lower part of the flashgun the camera is held by a fastening screw 26 (see FIGS. 2 and 2a) screwed into a stand or tripod threaded hole 27 of the camera 18. The fastening screw 26 has a head 29 carrying a threaded pin 30 which is screwed into said threaded hole 27. The fastening screw 26 is inserted into the guide recess 17 of the flashgun part 1 as indicated by the arrow (see FIG. 2a) and the threaded pin 30 fits the slit 31 and screw head 29 fits the guide recess 17. Thus when the flashgun unit consisting of the parts 1, 2 and 3 has been slid on, the camera is mounted on the lower part 1 of the flashgun. The fastening screw 26 (in dotted lines), which fits into the camera tripod thread, may be appropriately secured inside the guide way 17 of the lower part 1 by a spring (not shown) which encloses the screw head, into which spring the screw head snaps when the camera is slid in. The guide way 17 can appropriately be closed at the front by a movable lid (not shown).

The camera 18 indicated in FIG. 2 by broken lines is inserted between the two casing parts 1 and 2 and is secured to the upper part by a mounting foot 15 which is inserted in the retainer shoe 28 of the camera as generally known in the art. The retainer shoe 28 is similar to the structure of the guide recess 17 (shown in FIG. 2a), and the mounting foot 15 is inserted into this retainer shoe 28 in the same manner as the screw 26 into the guide recess 17 shown in FIG. 2a. The element 16 is the appropriate resilient middle contact as generally known in the art which makes the electric connection of the camera shutter with the ignition circuit of the flashgun in generally known manner.

The side view of FIG. 1 shown in FIG. 2 shows how camera 18 (broken lines) is embraced by the two parts 1 and 2 of the flashgun. 19 marks here the control glow lamp, which can be observed through the slit 14.

It will be seen that the flashgun in accordance with the invention can be pushed on the camera extremely simply and comfortably and thereafter forms with the camera itself in the outside dimensions and shape a compact unit easily to be handled. The thin solid member 3 is not a hindrance.

Figure 4:
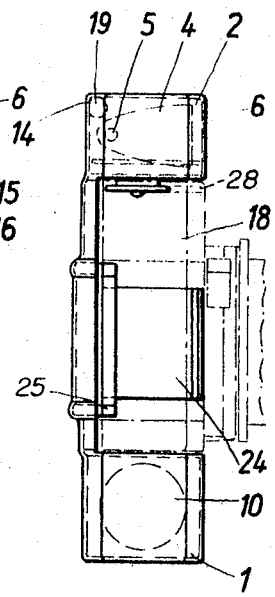
FIG. 4 is the appropriate side view with the camera drawn in broken lines.

The flashgun may be also attached to the camera casing by means of a leaf spring 24 which is pivoted by a hinge 25 on the solid member, see FIG. 4; in this case the fastening by means of elements 15 and 17 can be dispensed with.

Figure 3:
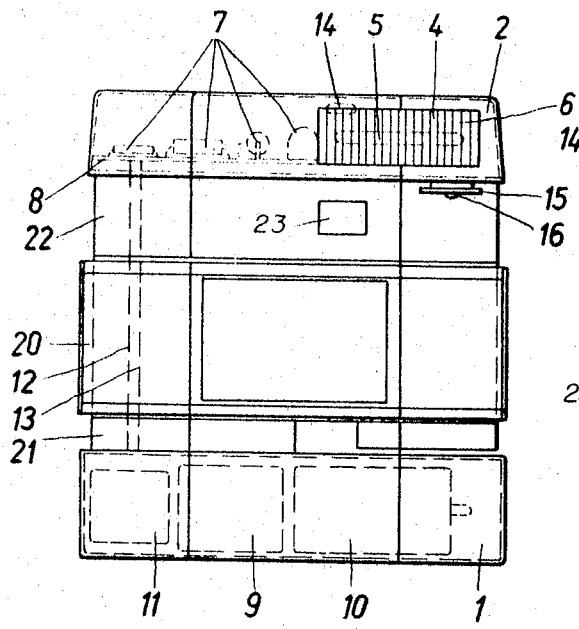
FIG. 3 is another form of design for the flashgun in accordance with the invention, in which the back wall of the camera itself acts as a web to connect the two parts of the flashgun.

Another form of design is shown in FIGS. 3 and 4, in which the solid member at the same time forms the back wall 20 of the camera. On this back wall lower and upper parts 1 and 2 of the flashgun are fastened by means of the rigid parts 21 and 22. There is an opening 23 in the connecting part so that the viewfinder of the camera can be used. The other elements are the same as in FIGS. 1 and 2 and are marked with the same figures.

The camera 18 (shown by broken lines) is inserted—as already indicated in FIG. 2 too—between the upper and lower parts 1 and 2 of the flashgun. It is attached to the flashgun parts by the retainer shoe 28 into which the mounting foot 15 is inserted in the same manner as described for FIG. 2.

In the last exemplary design the flashgun forms the back wall of the camera. This back wall with the attached flashgun must in accordance with the invention be placed on the camera after the normal camera back wall has been removed from the camera. A prerequisite for this is that the normal back wall of the camera is exchangeably mounted.

A particular advantage of the invention, apart from the saving of space and ease of operation of the arrangement, is to be seen in the fact that even when the flashgun is mounted on the camera the user has a compact unit which is convenient to use.

What is claimed is:
1. Electronic flashgun for attachment to a photographic camera comprising upper and lower structural parts, said parts being joined by means of a rigid member and containing the electrical components required to produce the flash, said upper part being adapted to contact the top side of a camera attached to said flashgun and having means for rigid connection with the top side of said camera, said lower part being adapted to contact the bottom side of said camera and having means for the rigid connection with the bottom side of said camera, said means for mounting said upper part to said camera consist of a mounting foot attached to said upper part and cooperating with a retaining shoe of said camera, and said means for mounting said lower part to said camera consist of a guide recess arranged in said lower part which is adapted to take up the fastening screw for being screwed into the tripod thread of said camera.

References Cited

UNITED STATES PATENTS

| 2,783,696 | 3/1957 | Sewig | 95—11 |
| 2,868,958 | 1/1959 | Bounds | 240—1.3 |
| 3,134,547 | 5/1964 | Kapteyn et al. | 240—1.3 |
| 2,213,749 | 9/1940 | Strauss | 95—11 |
| 3,204,089 | 8/1965 | Schmidt | 240—1.3 |

FOREIGN PATENTS 1,219,752  12/1959  France.

NORTON ANSHER, Primary Examiner
C. E. SMITH, Assistant Examiner

U.S. Cl. X.R.
95—11